US011297261B2

(12) United States Patent
Gutierrez et al.

(10) Patent No.: US 11,297,261 B2
(45) Date of Patent: Apr. 5, 2022

(54) SPECIAL EFFECTS SYSTEM PROVIDING A WALKING CHARACTER

(71) Applicant: Disney Enterprises, Inc., Burbank, CA (US)

(72) Inventors: Jose A. Gutierrez, Burbank, CA (US); John Sebastian Larena, Los Angeles, CA (US); Daniel M. Joseph, Orlando, FL (US); Sean Paul Torres, Santa Clarita, CA (US)

(73) Assignee: Disney Enterprises, Inc., Burbank, CA (US)

(*) Notice: Subject to any disclaimer, the term of this patent is extended or adjusted under 35 U.S.C. 154(b) by 224 days.

(21) Appl. No.: 16/830,116

(22) Filed: Mar. 25, 2020

(65) Prior Publication Data
US 2021/0306573 A1    Sep. 30, 2021

(51) Int. Cl.
G03B 21/14     (2006.01)
H04N 5/262     (2006.01)
H04N 5/225     (2006.01)
H04N 5/222     (2006.01)
G03B 15/06     (2021.01)
H04N 9/31      (2006.01)
A63G 31/16     (2006.01)

(52) U.S. Cl.
CPC ............ H04N 5/262 (2013.01); G03B 15/06 (2013.01); G03B 21/145 (2013.01); H04N 5/2224 (2013.01); H04N 5/2256 (2013.01); H04N 9/3179 (2013.01); A63G 31/16 (2013.01)

(58) Field of Classification Search
CPC ...... G03B 21/00; G03B 21/003; G03B 21/10; G03B 21/32; G03B 21/145; G03B 21/2046; G03B 15/06; G03B 15/08; H04N 5/262; H04N 5/2224; H04N 5/2256; H04N 9/3141; H04N 9/3152; H04N 9/3179
See application file for complete search history.

(56) References Cited

U.S. PATENT DOCUMENTS 9,541,816 B2 *   1/2017  Derks .................... G03B 21/56
2005/0110960 A1 * 5/2005 Mao ........................ G09F 19/22
                                                     353/100
2015/0358574 A1 * 12/2015 Henion ................... G03B 21/62
                                                     348/745

* cited by examiner

Primary Examiner — Sultan Chowdhury
(74) Attorney, Agent, or Firm — Snell & Wilmer L.L.P.; Kent A. Lembke

(57) ABSTRACT

A special effects system for creating a unique walking character effect or illusion. The character appears to the observer to be a physical character or to have dimensionality rather than being two dimensional. The illusion or effect is achieved by mounting a projector and a thin, vertical, flat screen onto an automated cart or sled. The cart is adapted to roll on a track positioned to run from a backdrop or backwall toward a viewing space in which one or more observers or viewers may be located during system operations. The media (or video file) of the character walking is projected on the projection surface of the screen element with the projector. The sled or cart is triggered to roll forward toward the viewing space as the media is playing so that the projected image appears to be moving and getting closer to the viewer.

22 Claims, 8 Drawing Sheets

SPECIAL EFFECTS SYSTEM PROVIDING A WALKING CHARACTER

BACKGROUND

1. Field of the Description

The present description relates, in general, to special effects and display system systems designed to provide effects in a repeatable manner. More particularly, the present description relates to a special effects system adapted to provide the effect of a physical or three-dimensional (3D) character walking relative to an observer at a known location or in a viewing space.

2. Relevant Background

In theme and amusement parks and other settings, there are many situations where it is desirable to provide a special effect or illusion to entertain and excite visitors or observers. Further, each of these special effects or illusions needs to be provided over-and-over or in a repeated manner over the day and, often, the time between presenting the special effect or illusion is relatively short (e.g., a minute or less). These design requirements can present design challenges to those in the special effects industry beyond simply generating an effect successfully and in a manner that is believable to the observer. For example, theme and amusement park rides and attractions often include special effects that need to be produced with high quality to be believed and enjoyed by ride and attraction participants and in a quickly repeatable manner to support the flow of participants through such rides and attractions.

A particularly challenging effect is how to provide a walking character without the use of human actors. For example, the character may be a human character or human-like character from a movie, and it is desirable to present that character to observers in a viewing space (e.g., riders in a park ride or attraction vehicle) with that character walking. Some special effects systems may include a robotic figure to try to achieve the walking character effect, but these robotic figures can be very challenging to design and specially to replicate particular character's walking patterns as each character may walk differently. Further, these robotic figures may be also be expensive to fabricate and maintain.

Hence, there remains a need for special effects systems for providing walking characters or achieving the illusion of presence of a walking physical character near a viewing space in which one or more observers may be located. Preferably, such special effects systems would be less complex and expensive to implement than those relying upon robots or robotic figures.

SUMMARY

With the above design challenges in mind, a special effects system was created to provide the effect or illusion of a character walking near or adjacent to a viewing space. Particularly, the special effects system is useful for providing a walking character effect or illusion in which a physical or 3D character, such as character from a movie, is walking directly toward an observer in the viewing space. The special effects system is configured to provide this illusion or effect in a manner that an observer truly believes a human or other type of character is walking toward them. The illusion or effect can be produced by the new system in an easily repeated manner, without the system having to rely on use of complex robotic figures so that it is less expensive to implement and to maintain.

More particularly, a system is provided that is adapted to create a walking character special effect. The system includes a physical set with a platform with an upper surface adjacent a viewing space. A cart is provided with a support platform and a drive mechanism, which is operable, during an operating time period, to move the cart on a path on the upper surface between first and second positions relative to the viewing space (such as one a distance away from the viewing space and one close to the viewing space). The system further includes a screen element mounted on the support platform, and the screen element is substantially vertical and rigid and includes a projection surface facing the viewing space. Additionally, the system includes a video projector mounted on the support platform, and the video projector, during the operating time, projects images of a character that is walking onto the projection surface.

In some implementations, the system includes a track on the upper surface of the physical set, and the drive mechanism includes an electric motor driving a set of wheels contacting the track (e.g., riding on rails of the track). The first and second positions are chosen so the cart moves forward toward the viewing space, and the video projector projects the image by playing a video file providing a recording of the character walking toward a camera. The actual or actor walking may be at a particular or predefined speed, and the electric motor is controlled during the operating time to move the cart on the track at the predefined speed.

To achieve the optical illusion, the physical set further may include a back wall or backdrop positioned behind the upper surface and track with a surface of a first color facing the viewing space. The projection surface is designed to include a central region colored a second color lighter than the first color, and the central region is used to display the walking character. Further, the projection surface includes a framing region extending about the periphery of the central region and to an outer edge of the screen element, and the framing region is colored to fade between the second color proximate to the central region and the first color proximate to the outer edge. In some preferred embodiments, the first color is absolute black while the second color is a light to medium gray.

In some embodiments, the system also includes a moving prop assembly including a prop movement mechanism attached to a back surface of the screen element and a physical prop linked to the prop movement mechanism (e.g., with an end attached to a mechanical arm or the like). The prop includes an elongated body that extends outward from the screen element toward the viewing space (e.g., by extending outward through a slot in the screen element from the back side where it is coupled to the prop movement mechanism). The prop movement mechanism operates during the operating period to move the body through a set of movements.

In these or other embodiments, the body of the physical prop may be configured to house a lighting assembly that operates to illuminate the body. Then, the physical prop may include a light shield blocking light from the illuminated body from striking the projection surface. Still further, the physical prop further may include a drive element operating during the operating period to rotate the body about a longitudinal axis. In some implementations, the drive element comprises an electric motor and the body of the prop includes: (a) a central tube coupled to the electric motor for rotation about the longitudinal axis; (b) at least one strip of light emitting diodes (LEDs) extending along an outer surface of the central tube; and (c) a layer of diffusing material over the at least one strip of LEDs.

It is useful in some embodiments of the system for the physical set to include sidewalls defining a tunnel, and the first and second positions for the cart are within the tunnel. An interior surface of the sidewalls may include a series of spaced apart surfaces adapted for illumination upon receiving black light, and the system further may include a black light source directing, during the operating period, black light across the tunnel toward the series of spaced apart surfaces. The video projector may project the image by playing a video file recording the character walking through lights provided by two or more light sources in the recording studio, for example. The physical set can then further include two or more faux light sources with positions based on positions of the two or more light sources during the recording, and each of the faux light sources includes a container with a surface facing the viewing space and a light source directing light, during the operating period, onto the surface facing the viewing space and not toward the projection surface.

DETAILED DESCRIPTION

Figure 1:
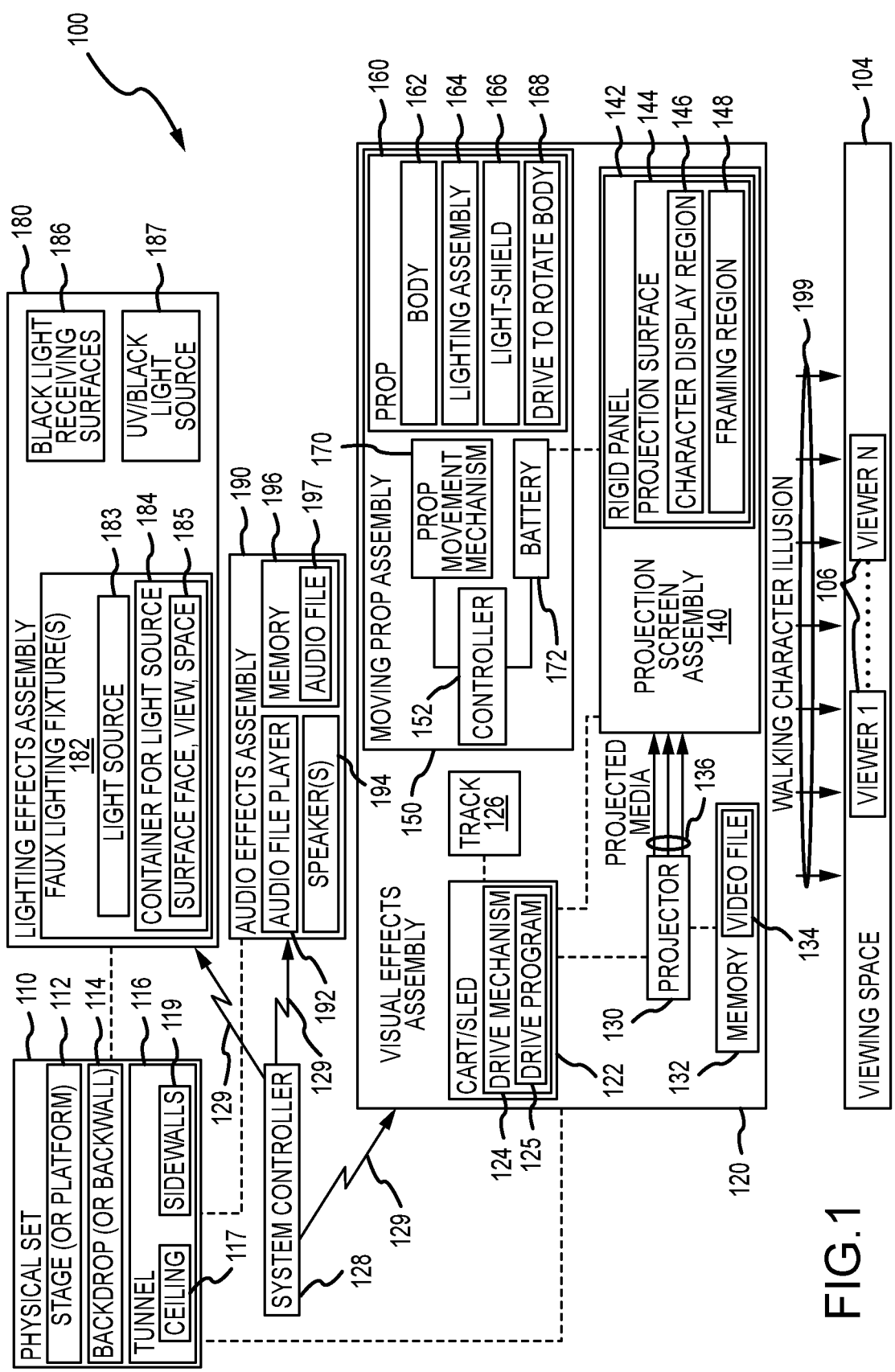
FIG. 1 is a functional block drawing of a visual effects system of the present description that is adapted to produce a moving or walking character illusion or effect for viewers/observers in a viewing space.

In brief, a special effects system is provided that creates a unique walking character effect or illusion. The character appears to the observer (e.g., a rider in a vehicle on a ride or attraction at a theme park) to be a physical character or to have dimensionality rather than being two dimensional. Further, the walking character can be produced with the system with the exact gait or other walking traits of a character that may be well known to the observer such as a character from a movie. The system is relatively inexpensive to implement and maintain when contrasted with other potential solutions to the walking character effect including those with walking robotic figures or the like.

Prior to turning to the figures and particular exemplary implementations, it may be useful to the reader to provide a brief overview of the new special effects system. The illusion or effect is achieved by mounting a projector and a thin, vertical, flat screen onto an automated cart or sled. The cart is adapted to roll on a track positioned to run from a backdrop or backwall toward a viewing space in which one or more observers or viewers may be located during system operations. The media (or video file) of the character walking (e.g., toward the camera and through a space similar to that replicated in the special effects system) is projected on the projection surface of the screen element with the projector. The sled or cart is triggered to roll forward toward the viewing space as the media is playing so that the projected image appears to be moving and getting closer to the viewer (e.g., appears to grow in size as the screen is moved toward the viewings space).

A physical prop such as an energy sword (or light saber) is mounted to the side of the flat screen on an automated arm, which is coupled to a drive mechanism that may be attached to the back surface/side of the flat screen. The drive mechanism is configured along with programming of its controller/driver to move the arm at a rate and in a pattern (e.g., up and down or side-to-side) that simulates the movement of the character's arm (e.g., a human's arm) during walking as one's arms typically are not held steady during walking.

The system may include a physical set with a hallway or tunnel defined by sidewalls and a ceiling and by a floor or stage/platform supporting the track upon which the cart/sled rides. The hallway/tunnel may be designed with minimal structure and kept relatively dark so the projector's output light is more readily perceived by an observer and to disguise the presence of system components including the flat screen. The ceiling (or another surface) may have a series of faux lights (faux down lights if on ceiling). When the media or footage of the character is filmed/recorded, it can be shot with the character walking in and out of a series actual light sources in positions similar in the filming studio or set as recreated in the visual effects system (e.g., set above the walking actor when faux down lights are to be used in the system). Then, when the footage is played back on the projection surface of the flat screen as it is moved on the cart through the hallway/tunnel, it appears that the projected character is actually being lit by the series of faux lights.

There may also be a black light fixture in the system that is strategically positioned forward in the tunnel/hallway nearer to the viewing space than to the backdrop and upon one side of the tunnel/hallway. The black light fixture (or UV light source) is arranged to direct or shoot its light diagonally across the track to the opposite side of the hallway/tunnel (such as at a height one third to one half (or more) the height of the tunnel) so as to illuminate one or more surfaces of the sidewalls that are selected and/or treated or painted to be illuminated by black light (e.g., painted with black light paint or the like). As the cart and vertical screen it supports moves forward through this transmitted black light, a shadow is cast on the opposite side of the hallway or tunnel as the flat screen physically blocks the black light. This shadow effect reinforces the illusion for the observer in the viewing space that a physical object is moving toward them.

The illusion is also retained and enhanced through careful design of the projection surface of the flat screen. Particularly, it has proven useful for the projection surface to include a central area (i.e., a "character display region") that is painted (or otherwise formed to be) a lighter color (such as a light to medium gray in some embodiments) than a surrounding edge or framing region of the projection surface. In some cases, the framing region is painted a gray that is darker than the central area immediately adjacent the central area and then gradually darker and darker gray to absolute black (i.e., the color of the backdrop) on the very outer edges of the projection surface (front surface) of the flat screen. The back wall or backdrop is typically painted a very dark color such as absolute black (or otherwise provided with exposed surfaces of this color). As a result of the relative coloring of the flat screen in front of the back drop or back wall, the media of the character as it is walking appears brighter as it is projected onto the lighter area of the vertical flat screen. The outer physical edge of the flat screen is hidden from view by the observer in the viewing space because it black (or at least very dark colored) edge disappears against the black back wall or backdrop. The end result is that when the new special effects system is operating is that the projected walking/moving character appears to be physical as opposed to a projection in part because there does not appear to be any perceivable screen edge.

FIG. 1 is a functional block drawing of a visual effects system 100 of the present description that is adapted to produce a moving or walking character illusion or effect 199 for viewers/observers 106 in a viewing space 104. The viewing space 104 may take a wide variety of forms such as a vehicle of a theme park ride or attraction or a space nearby a display, and the viewers 106 are able to perceive a physical or 3D-tye walking character illusion 199 during operations of the system 100 without the need for special 3D eyewear or headgear. Instead, the illusion or effect 199 is achieved through the unique combination of the components of the system 100 as discussed herein.

The viewing space 104 is provided adjacent to a physical set 110 with a stage or platform 112 that is observable by the viewers 106 in the space 104. Particularly, the viewers 106 are provided a line of sight that is upstage (or up the stage or platform 112) to a back wall or backdrop 114, and, to enhance the visual effect 199, the backdrop's surface facing the viewers 106 is typically a relatively dark color, such as through painting with a dark gray to an absolute black paint (with darker preferred in some embodiments to allow the screen element or rigid panel 142 to be hidden from viewer 106 more effectively). The character may be shown to be walking in the open, but it has been shown by the inventors in prototyping that providing physical points of reference along the path "walked" by the character enhances the illusion 199 for the viewer 106. Along these lines, the physical set 110 further may include a hallway or tunnel structure 116 with an interior space defined by a ceiling 117 and sidewalls 119, and, this interior space is open to or has an open end that is observable by viewers 106 in the viewing space (e.g., the tunnel 116 has a first end (and opens) at the viewing space 104 and a second end opposite the first end at or near the backdrop 114).

The system 100 includes a walking character effect or visual effects assembly 120 that plays a major role in producing the moving or walking character illusion 199 during operations of the system 100. The assembly 120 includes a cart or sled 122 that is adapted to ride or roll in or on a track 126. The track 126 defines the path traveled by the moving or walking character in the set 110, and, in some embodiments, the track 126 is a straight length of track material (e.g., one or two rails or the like) on un upper surface of the stage 112 extending from the backdrop 114 a distance toward the open end of the tunnel 116 and the viewing space 104. In other cases, the track 126 may include one or more curves to achieve a desired effect. Also, the upper surface of the stage 112 may be planar or may include some variation in height to achieve a desired "walking" of a character or another desired effect.

The cart or sled 122 includes a drive mechanism 124 that can be operated in response to control or trigger signals 129 from a system controller 128, which may be any computing or electronic device with wired or wireless communications with components of the system 100 including the assembly 120, the lighting effects assembly 180, and the audio effects assembly 190. Particularly, the driver or controller of the drive mechanism 124 may run a drive program 125 that sets the pace or rate of movement of the cart/sled 122 along the track 126 to suit the walking motion of the character being simulated in the illusion 199. In other words, the drive program 125 allows the cart's movements on track 126 to be automated to provide the pace of movement (in feet/second or the like) that is defined for the character in the media file 134 and is expected by a viewer 106. The drive mechanism 124 may take a wide variety of forms to implement the cart 122 but will often include an electric motor that is used to drive wheels (or the like) that are mating with rails of the track 126. In some cases, the drive mechanism 124 may be a bogie provided above or below the stage's upper surface (and the track 126 may also be provided fully or partially below the stage's upper surface).

Significantly, the visual effects assembly 120 further includes a projector 130 also triggered into operation by the control signals 129 from controller 128 to project light/media 136. The projector 130 is mounted onto a support platform (not shown in FIG. 1) of the cart/sled 122 and is directed so it output light 136 is directed toward the backdrop 114 and away from the viewing space 104 (so the presence of the projector 130 is hidden from viewers 106). The projector 130 may be a short throw projector so that it can be in proximity (e.g., within 1 to 3 feet) of the projection surface of the system 100 and may be chosen to provide the output 136 with high brightness (e.g., 1000 to 6000 lumens or greater). The assembly 120 includes data storage or memory 132 for storing a video file 134 (or this may be provided at controller 128 with wireless or wired streaming of the media to the projector 130), and the projector 130 plays back the video file 134 to output 136 a walking (or running, jumping, or otherwise moving) character.

The media or video file 134 is created to enhance the illusion 199. In general, a digital file 134 is created that shows a character walking/moving in the way desired for the illusion 199, such as walking directly toward the camera recording their movements (or this may be achieved with virtual cameras for an animated or CGI character). Further, though, it is often useful to have the actor performing the character's walking/moving to be placed in an environment that matches that of the physical set during operations of the lighting effects assembly 180. For example, the actor may be recorded walking down a relatively dark tunnel with one or more lights, which can be replicated in the lighting effects assembly 180 with faux lighting fixtures 182. As discussed above, the speed or pace of the movement/walking by the actor during the recording of the media in file 134 can be measured and used to define in the drive program 125 the pace of the cart 122 provided during operations of the drive mechanism 124 that is provided concurrently with playback of the file 134 by the projector 130 to project the character image 136.

The visual effects assembly 120 further includes a projection screen assembly 140 with a screen element or rigid panel 142 that is mounted on or supported by the support platform of the cart/sled 122. The panel 142 may be provided as a section(s) of a sheet of rigid material such as a plastic, wood, or the like that is chosen to be relatively light but to be relatively rigid to provide a steady projection screen surface during movement of the cart/sled 122. The panel 142 is preferably sized and shaped to match the character being provided in the illusion 199 such as to be generally rectangular with a semi-spherical upper end to suit a human or human-like character with a width of 2 to 4 feet and a height of 3 to 7 feet. The panel 142 typically planar but may be configured with one or more curved surfaces in some cases to suit a particular visual effect 199.

The rigid panel or screen element 142 has a surface 144 (projection surface) facing the projector 130 to receive the light 136 and also facing the viewing space 104 (and away from the backdrop 114). As a result, the viewers 106 are able to view the walking character, which was previously recorded or generated for file 134, in the illusion 199 because the illusion 199 includes light reflected or transmitted off of the projection surface 144 toward the eyes of the viewers 106 in the viewing space 104. The panel 142 is arranged generally vertical (e.g., +/−15 degrees from orthogonal to stage upper surface) and, often, is arranged at vertical or with the projection surface 144 being orthogonal to the upper surface upon which the track 126 is mounted. To disguise the use of projection in system 100, the screen element/panel 142 is hidden from the view of the viewers 106 by dividing the projection surface 144 into two (or more regions). A first area or region 146 is defined upon which it is desired to display the character with projected light 136, and this area/region 146 is preferably centrally located on the surface 144 or at least spaced apart some distance (e.g., 1 to 6 inches or more) from the outer edges of the surface 144. This region 146 may be labeled the "character display region" or area.

A second area or region 148 on the projection surface 144 is a boundary, edge, or framing region or area that encircles (wholly or at least in upper portions of the center region 146) the center region 146, and it may have a width of 1 to 6 inches or more to provide a canvas to gradually darken the color of the projection surface 144 from that in the central region 146 to that of the backdrop or back wall 114. The character display region 146 may have a lighter color such as white to gray to medium gray (via painting or the like) while the backdrop 114 (or its surface facing the viewing space 104) will be much darker such as dark gray (or another dark color) to black to absolute black. Then, the framing region 148 can be colored two or more colors to fade from the first color of the central region 146 to the second color of the backdrop 114, e.g., the framing region 148 may be a gray that is somewhat darker than that of the central region 146 near the outer boundaries or edges of the central region 146 and then get progressively darker (at a steady rate or other determined fade out rate) until it has a color that matches (or is very close to that of) the backdrop 114 such as absolute black at outer edge of surface 144 (e.g., for final 0.25 to 1.5 inches of the width of the framing region 148). This coloring scheme makes it very difficult for the human eye (of the viewer 106) to pick up the presence of the panel or screen element 142 in combination with proper lighting provided by lighting effects assembly 180 (or from the viewing space 104 (i.e., try to limit light spilling into tunnel 116 from viewing space 104)).

In addition to projection of media 136 by projector 130, the walking character illusion 199 is enhanced or achieved by the inclusion of a moving prop assembly 150 in the visual effects assembly 120. Relying solely on projection of content can lead to the viewers 106 assuming or wondering if the effect is a projection trick and that what they are seeing is only a 2D image. To dispel, at least in part, this notion, the moving prop assembly 150 is included to provide additional physicality to the viewed illusion 199. To this end, the assembly 150 includes a prop 160 with a body 162 that is pivotally or otherwise mounted upon or supported on the screen element 142 to be moved or driven through a range of motions by a prop movement mechanism 170. The body 162 may be an elongated member such as a cylinder or tube, and it may extend out some distance from the panel 142 in front of or to the side of the projection surface 144 (e.g., through a slot or groove in the panel 142).

The movement mechanism 170 may be linked to an end or other portion of the body 162 (such as a portion extending outward from the groove/slot on a side of the panel 142 opposite the projection surface 144 to be hidden from view by a viewer 106), and mechanism 170, which is powered via battery 172 and controlled by controller 152 in response to signals 129 from controller 128, may drive (e.g., with an electric motor or the like) the body 162 to move relative to the projection surface 142 often in a pattern expected of a prop/object held by a 3D or physical actor or character moving as the character in the video file 134. For example, the body 162 may be moved side-to-side or up-and-down with movements of a hand of the character "holding" the object/prop 160. This movement of a physical and, typically, 3D body 162 furthers the belief by the viewers 106 that the character in in the illusion 199 is physical and 3D.

In some embodiments, the prop 160 may include a lighting assembly 164 operating to output light from the body 162 to achieve a desired light-based effect as part of the illusion 199. For example, the prop 160 may be a flashlight or similar device, may be an electronic device with an illuminated screen(s), and/or may be a weapon that has illuminated surfaces, and the lighting assembly 164 includes one or more light sources (e.g., white or colored LEDs or LED arrays or strips) outputting light visible to the viewers 106. This light preferably is blocked (or limited) from striking the projection surface 144 as this could ruin or diminish the character illusion 199 (or its visual effect from projected media 136). To address this issue, a light shield or blocking member 166 is included with the prop 160, and it is mounted on or relative to the body 162 so as to be disposed between the light sources of the assembly 164 and the projection surface 144 during movement of the body 162 by the prop movement mechanism 170. The shield 166 may be formed of a rigid but thin sheet of opaque material (or material that blocks output of sources in assembly 164) such as a dark plastic or the like, and it may have a semi-cylindrical body that extends the length of the body 162 or to have a length matching or greater than the length of the light sources in lighting assembly 164 to block light from reaching the projection surface 144 (e.g., the sources may include 24-inch strips of LEDs and the shield may be 24 inches or more in length).

In some embodiments, the prop 160 may be configured with additional onboard movement and not only rely upon the movement mechanism 170 to have movements/motion. This is useful to further dispel the notion that the prop 160 is being projected as part of the illusion 199 and/or to provide component movements that would be expected for the prop 160 by the viewer 106 if it were in use by the character in the illusion 199. For example, the prop 160 may be a tool or weapon with one or more spinning or moving features, and a drive 168 is provided on or in the body 162 to selectively move these features. In some cases, the body 162 itself is caused to move (e.g., rotate about its axis or the like), and the drive 168 is coupled to the body 162 and is adapted to provide this movement of the body 162 (or a portion of the body 162 relative to other portions of the body 162) during use of the prop 160 and, typically, concurrently with the operations of the lighting assembly 164. This movement may also cause the light sources in assembly 164 to move such as when they are attached to surfaces of the body 162.

To further enhance the walking character illusion 199, the system 100 is shown to include a lighting effects assembly 180. The assembly 180 includes faux lighting fixtures 182 that are configured to appear to the viewers 106 in illusion 199 to provide lighting of the character found in the video file/media 134. To this end in each fixture 182, a light source 183 (such as an LED) is provided in a container 184 with a surface 185 facing the viewing space 104, and, during operations of the system 100, the light source 183 outputs light that is directed toward the surface 185 and not toward the interior space of the tunnel 116 and, more importantly, the projection surface 144. In this way, light reflected from the surface 185 is provided in the illusion 199 to the viewer 106 to make it appear that light fixtures 182 are lighting the character displayed by light 136 on projection surface 144 as was the case for an actor filmed walking in the media 134. For example, the character can be filmed walking through a tunnel with a number of downlights (in and out of light), and the faux lighting fixtures 182 may be provides to replicate these downlights.

The lighting effects assembly 180 may also includes components adapted for creating the effect in illusion 199 that the walking character is casting shadows in the interior space of the tunnel or hallway 116. To this end, one or more interior surfaces of the sidewalls 119 and/or ceiling 117 may include blacklight (or ultraviolet (UV)) receiving surfaces 186 that are configured to be illuminated by outputs of one or more UV/blacklight sources 187 that are directed toward them. Specifically, output of blacklights 187 is directed across interior space of the tunnel or hallway 116 so as to be in the path of the screen element 142 as it is moved on cart 122 along the track 126 (e.g., along the travel path defined by the track 126 in the physical set 110). In this way, the surfaces 186, which may be painted with blacklight or UV paint or otherwise formed to be illuminated by UV light, are visible to the viewers 106 in the dark hallway space until the screen element 142 is between the source 187 and the surfaces 186, which provides the walking character displayed on the projection surface 144 physicality as it appears to the viewer 106 to be casting a shadow. Further, this shadow moves with the screen element/panel 142 (or with the moving displayed character) in the illusion 199 perceived by the viewers 106.

Still further, the special effects system 100 may include an audio effects assembly 190 to enhance the walking character illusion 199. During operations of the system 100, the walking character illusion 199 includes sounds that the viewers 106 perceive to be associated with the movements of the character displayed on the projection surface 144. Particularly, during the creation of the video file 134, an audio file 197 can be created that records the noises (e.g., footsteps or footfalls) the actor makes when they perform the movements in the video file 134. The audio effects assembly 190 includes an audio file player 192 that accesses memory 196 to playback the audio file 197 over one or more speakers 194 concurrently (or time synchronized) with the playback of the video file 134. The speakers 194 may be located upon the cart/sled 122 or may be positioned at one or more locations on or in the sidewalls 119 or on the stage 112 (such as at one or more positions along the track and with the speakers nearer to the present location of the cart 122 being used by the player 192 to output the recorded walking/movement sounds). The inclusion of an audio feature to the illusion 199 increases the chances that the viewer 106 will believe the character has physicality and it plays on an additional one of their senses in a way the matches expectations.

Figure 2:
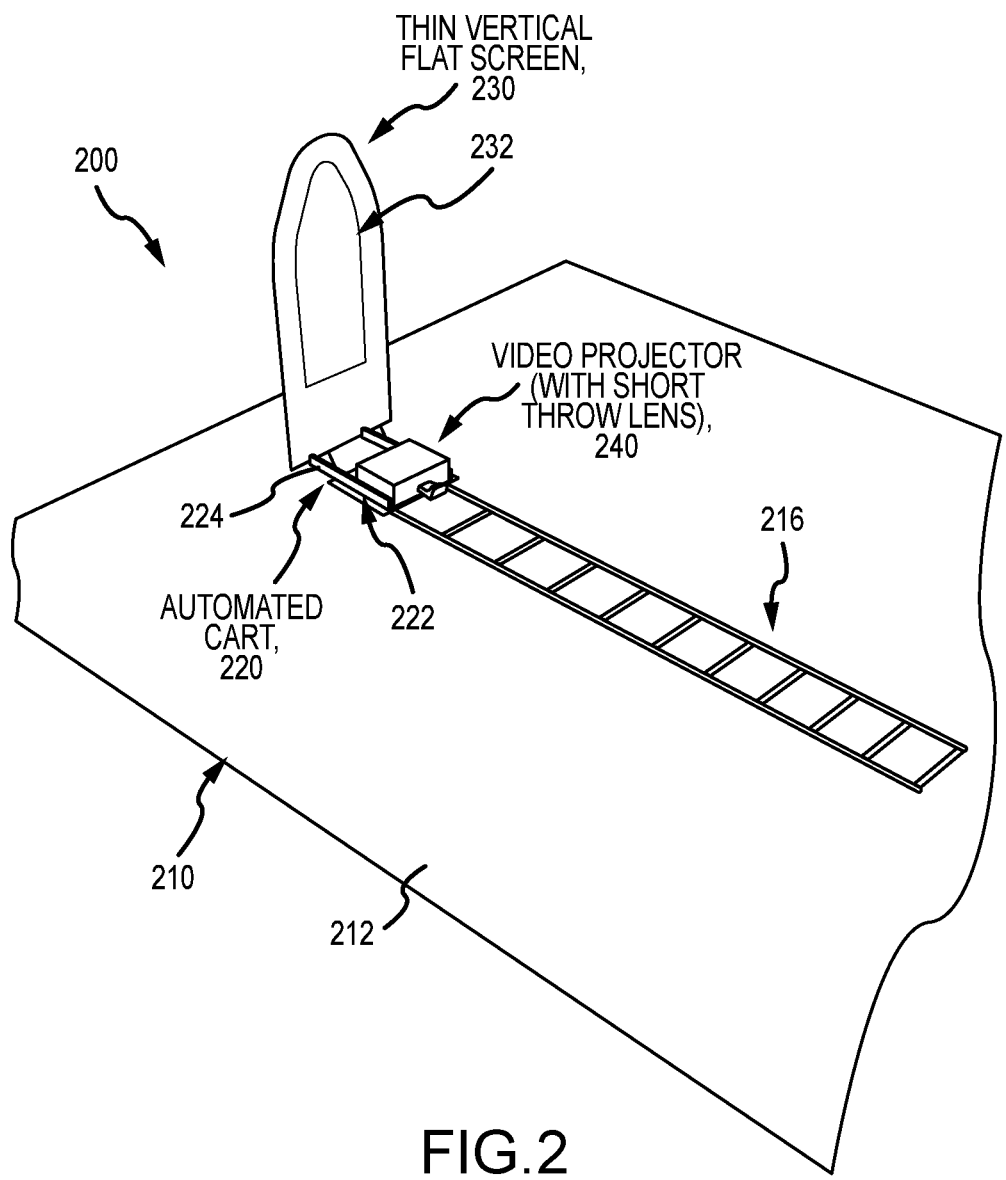
FIG. 2 is a top perspective view of a portion of a special effects system that may provide one exemplary implementation of the system of FIG. 1, with the backdrop and tunnel/hallway portions of the set removed for ease of explanation.

FIG. 2 is a top perspective view of a portion of a special effects system 200 that provides one exemplary implementation of the system of FIG. 1, with the backdrop and tunnel/hallway portions of the set removed for ease of explanation. As shown, a track 216 is mounted upon an upper surface 212 of a platform or stage 210, and the track defines a travel path for a character of the illusion or effect from a first position (shown) at a first end of the track 216 to a second position at or proximate the second end of the track 216. The second end of the track 216 typically would be proximate to a viewing space for viewers (both not shown but understood from FIG. 1). Here, the track 216 includes two spaced apart rails, each 10 to 20 feet or more long.

A cart 220 is included in the system 200, and the cart 220 includes a drive mechanism 222 that allows it ride upon and be supported by the rails of the track 216. The mechanism 222 may include an electric motor and battery operable to rotate a set of wheels to move the cart 220 from the first position shown to a second position some distance down the track 216 at a desired speed(s). The cart 220 further includes support arms 224 along with a support platform 425 (seen best in FIG. 4).

The illusion or effect is achieved, in part, by system 200 by mounting a projector 240 and a rigid flat screen or screen element 230 upon the cart 220. In this example, the screen element 230 is a thin sheet of rigid material (such as a hard plastic) with its bottom edge attached to the support arms 224. Its body is oriented vertically (or nearly so such as within 15 degrees of vertical plane) and with a front side or projection surface 232 facing the cart 220 (e.g., orthogonal to the travel path defined by the track 216 such as may be measured between a line drawn between the two spaced-apart rails of the track 216 and a plane extending through the projection surface 232). The size and shape of the screen element 230 and its projection surface 232, as discussed above, may be chosen to suit the size of the character to be produced in the illusion or effect, with the generally rectangular shaped base or lower portion with a rounded or semi-spherical upper portion being one useful example for projection surfaces for human or human-like walking characters.

Figure 3:
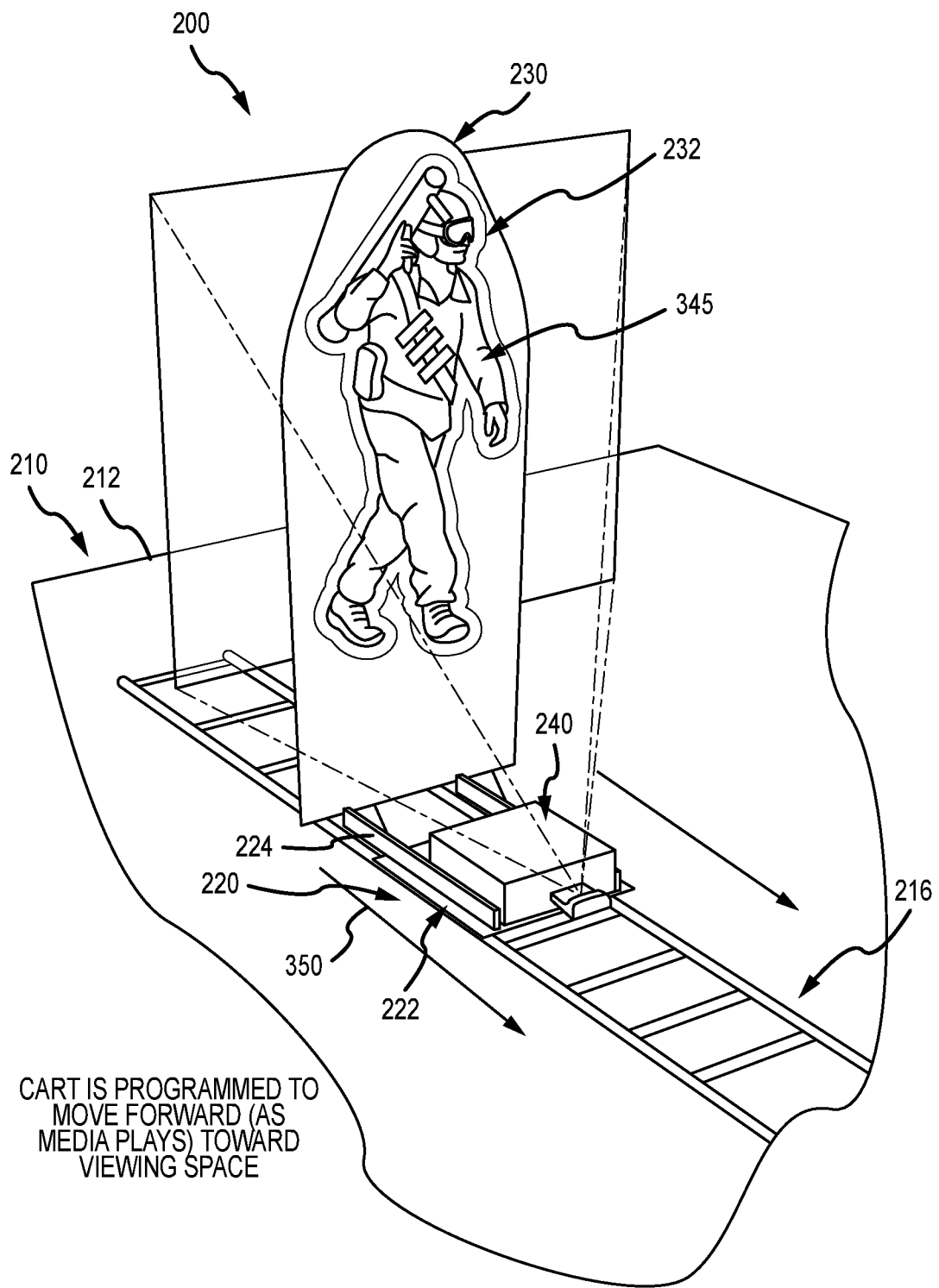
FIG. 3 illustrates the system of FIG. 2 with the cart and the projector operating according to the present description.

The projector 240 may be a video projector with a short throw lens chosen for its ability to project upon the nearby projection surface 232 (which may be 1 to 3 feet away from the short throw lens), and the projector 240 is typically mounted upon the support platform 425 of the cart 220 so that its output is focused upon a center area or region of the projection surface 232. Referring now to FIG. 3 and operations of the system 200, the previously recorded or created media of the character walking/moving is projected onto the thin vertical flat screen 230 during operations of the system 200. This is shown at 345 with an attempt to represent projector output light as seen upon the projection surface 232.

Concurrently, such as with synchronized trigger signals from a system controller to the projector 240 and cart drive mechanism 222, the cart 220 moves forward on the track 216 as shown with arrows 350 at a speed defined by a travel program (used by a controller in the drive mechanism 222 to operate the drive motor). The cart 220 is programmed to moved forward at a rate or speed suited to the movement/walking of the character in the displayed images 345 on the projection surface 232, and the movement 350 of the cart 220 causes the flat screen element 230 with the displayed images 345 to move toward the viewing space as would be expected by the viewers for a walking physical character.

Figure 4:
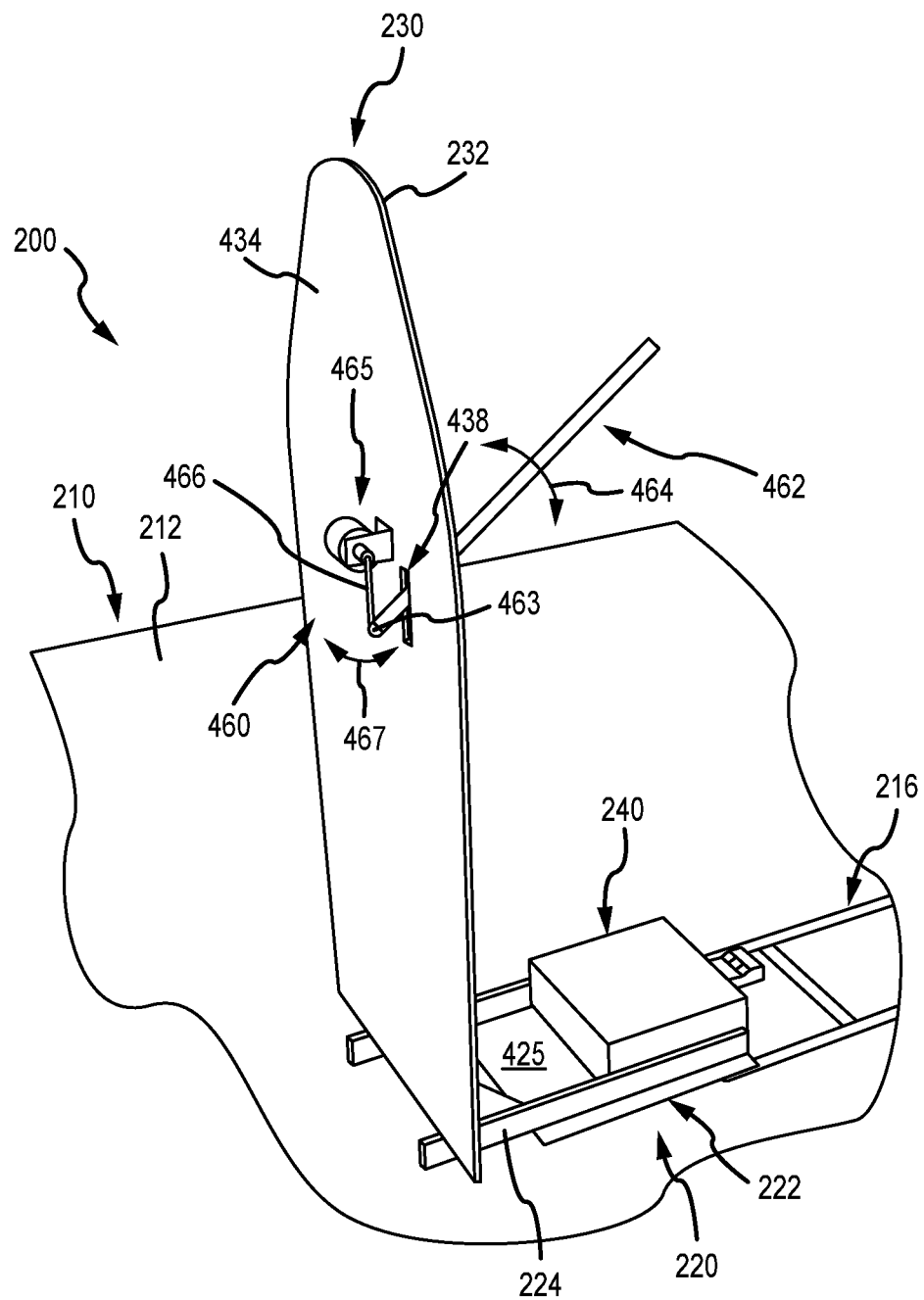
FIG. 4 is a rear side perspective view of the system of FIGS. 2 and 3 further showing inclusion and operations of a moving prop assembly that is mounted onto the vertical flat screen.

FIG. 4 illustrates the special effects system 200 in further detail showing the addition of a moving prop assembly 460 to the system 200. The assembly 460 includes a physical prop 462 that is associated with the screen element 230 so that a viewer perceives a 3D or physical object concurrently with the displayed images on the projection screen. The physical prop 462 is also supported so that it can be moved relative to the flat screen element 230 and, hence, relative to the displayed images of the walking character. In some embodiments, the physical prop 462 further includes a lighting assembly to output light and includes an onboard drive that causes one or more of its components to move (e.g., its body may be configured to spin). These additional features enhance the illusion or effect provided by the system 200 by making it clearer to the viewer that the prop 462 is not being projected which makes it more believable that the walking character is also not being projected.

In the example of FIG. 4, a prop movement mechanism or assembly 465 is mounted onto the back side 434 of the screen element 230. This assembly 465 may include an electric motor or other driver that is used to move a mechanical arm or link 466. The mechanical arm 466 is coupled to an end 463 of the physical prop 462 that extends through a slot or groove 438 in the screen element 230. The slot/groove 438 may be provided in an outer or framing region of the front side or projection surface 232, and it allows the prop 462 to be physically supported and manipulated by the prop movement mechanism 465 in a hidden manner while allowing a portion or length to extend outward from the projection screen 232 toward the viewing space (and viewers positioned therein).

During operations of the system 200, the mechanism or assembly 465 is programmed and/or configured to move the prop end 463 as shown with arrows 467, and this movement 467 combined with the guidance provided by the slot/groove 438 causes the prop 462 (or the portion of the prop body extending outward from the screen element 230) to move as shown with arrows 464. This may be up and down or side-to-side movements, and the speed, amount, and type of movement may be designed to match expected movements of a physical object held in a hand of the character in the image displayed on the projection surface 232 as it moves/walks toward the viewing space (e.g., to simulate a moving arm during walking).

Figure 5:
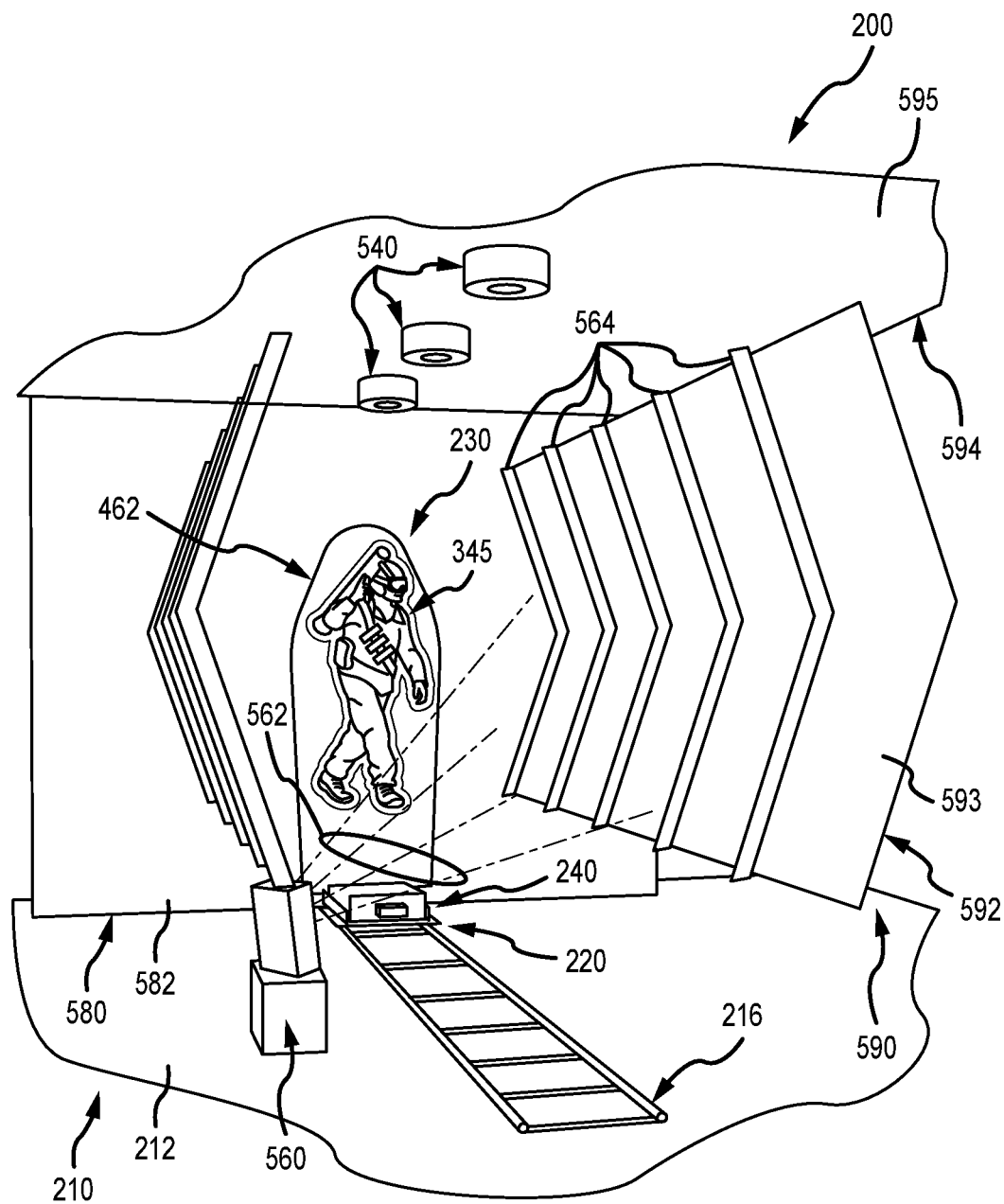
FIG. 5 is a front perspective view of the special effects system similar to that of FIG. 2 but showing the addition of the moving prop assembly as well as additional system components including a tunnel or hallway and backdrop in the physical set and a lighting effects assembly.

To enhance the illusion or effect, the physical set of the special effects system 200 may include several unique features, and the system 200 may include a lighting effects assembly, too, to providing lighting features or elements in the illusion or effect to further the belief that the walking character is physical. FIG. 5 illustrates some of these additional features and components in the special effects system 200. Particularly, the physical set includes, in addition to the stage or platform 210, a backdrop or back wall 580 with a side or surface 582 behind the screen element 230. The surface 582 of the backdrop 580 is painted a very dark color (or formed of a material of this color) such as black or, in some cases, absolute black.

The physical set further includes a tunnel or hallway defined by sidewalls 592, a ceiling 594, and the upper surface 212 of the stage/platform 210. The track 216 is positioned so as to run along the length of the interior space of the tunnel, and, during system operations, the cart 230 moves the screen element 230 from a first position near the backdrop 580 in the tunnel to a second position distal to the backdrop 580 that is at or near an open end of the tunnel near to a viewing space (e.g., the cart 230 moves from one end of the track to the other end and then back again prior to the next running of the illusion or effect). The inner surfaces or sides 593 of the sidewalls 592, the upper surface 212 of the stage 210, and downward facing surface 595 of the ceiling 594 may all be painted (or otherwise provided as) a dark color (such as a dark gray or black) so that the interior space of the tunnel is kept very dark to allow the projected light on the screen element 230 to be more easily perceived by a viewer.

The lighting effects assembly includes a set of faux down light fixtures 540 positioned at spaced apart locations in the ceiling 594 of the tunnel. As discussed with reference to FIG. 1, each fixture 540 may include a can or container with a surface facing toward the open end of the tunnel and the viewing space. Each fixture 540 further includes a light source (e.g., a white or colored LED) that is positioned to be out of sight from the open end of the tunnel and to direct it light onto the surface facing the viewing space. The light source does not direct light downward where it may strike the projection surface 232 and potentially ruin the effect produced by the system 200. When the footage of the character walking is filmed or generated, it is shot with them walking in and out of a series of down lights (or lights arranged differently to achieve a desired effect) set up above them in the film shoot. Then, when the projector plays the video file with the footage back on the moving screen element, it appears to an observer that the projected character is actually being lit by the series of faux down lights 540.

The lighting effects assembly further includes a black light or UV light fixture(s) 560 that is positioned and operated to cast UV light 562 across (e.g., diagonally back toward the backdrop 580 or upstage) the interior space of the tunnel or across the track 216. The UV light 562 strikes the inward facing surfaces 593 of the sidewall 592 which includes one or more surfaces 564 adapted to be illuminated by UV light (e.g., by painting with UV paint or the like). As shown, the UV receiving surfaces 564 are ribs on the surface 593 of the sidewalls, and these are illuminated when they are struck by the UV light 562. As the cart 220 and vertical screen element 230 rolls into the path of the UV light 562, a moving shadow is created across the ribs/surfaces 564 and sidewall 592 as the UV light 562 is blocked from reaching these UV receiving surfaces 564 by the screen element 230. Its projection surface 232 is configured to not be illuminated by the UV light 562 so that the projected imagery 345 is not changed and the presence of the UV light source 560 is hidden from an observer. The creation of the shadow reinforces the illusion of the walking character and makes it appear as though an actual physical character is coming forward through the tunnel.

Figure 6:
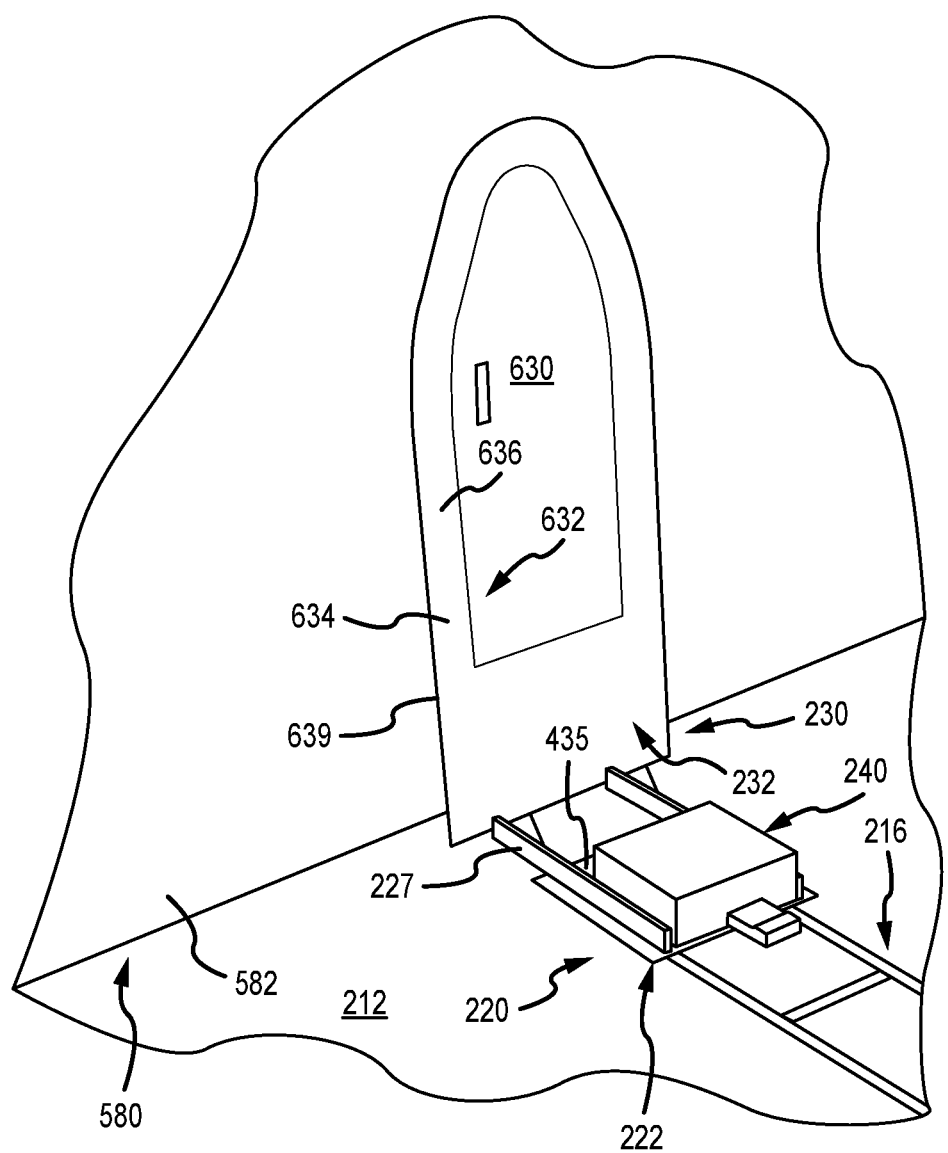
FIG. 6 is a partial view of the special effects system of FIG. 5 when the projector is not operating to project light that is useful for showing the configuration of the backdrop and projection surface of the screen element.

FIG. 6 provides an enlarged view of the system 200 showing configurations of the screen element 230 to better achieve the illusion or effect during operations of the system 200. Particularly, the surface 582 of the backdrop or back wall 580 is painted a very dark color such as absolute black (or the surface 582 is otherwise formed to have this dark coloring) so the edge 639 of the projection surface 232 cannot be readily perceived by an observer. To further hide the screen element 230, it is useful to have a central or character display region 630 of the projection surface 232 that is a color that is lighter than a framing region 632 (with a width of 1 to 6 inches) that extends about its periphery. The framing region 632 may have two or more sections itself that are colored (e.g., painted) darker and darker until at the outer edge 639 of the projection surface it matches that of the backdrop surface 582.

In one useful implementation, the central area or region 630 was painted a medium gray. The framing region 632 was painted a darker gray in a first section/region 634 adjacent to the central region 630 and is faded to absolute black in a second section/region 636 more distal to the central region 630 and adjacent to the screen edge 639. More generally, the region 636 is the same color as the backdrop surface 582, and this may be achieved by painting one or both of these surfaces or through other techniques. Instead of sectioning the region 632, it may be treated as a single section and its coloring gradually faded from the color of the central region 630 to the color of the backdrop surface 582. As a result of this coloring scheme for the screen element 230 and backdrop 580, the media of the walking character appears brighter as it is projected onto the lighter area/region 630 of the vertical flat screen 230. The outer physical edge 639 is hidden because its black edge disappears against the black back wall 580. The end result is that the moving character appears to be physical as opposed to a projection in part because there does not appear to be any perceivable screen edge.

As discussed with reference to FIG. 1 and the moving prop assembly 150, it is useful to provide a physical prop in the special effect system to provide a physical or 3D object that a viewer links to the walking character. By having it move relative to the projection surface, it appears to be affected by the displayed image/character. To further show to the viewer that the prop is not simply projected, it is useful to have the prop be self-illuminating and, often, with a brightness that exceeds that of the projected light on the screen element. Further, it is useful to animate this onboard lighting and, in some cases, to animate the prop itself with onboard or local moving components (e.g., move the whole prop relative to screen element and then also have the prop itself having moving parts), which reinforces to the observer that the prop is physical and not merely projected.

Figure 7:
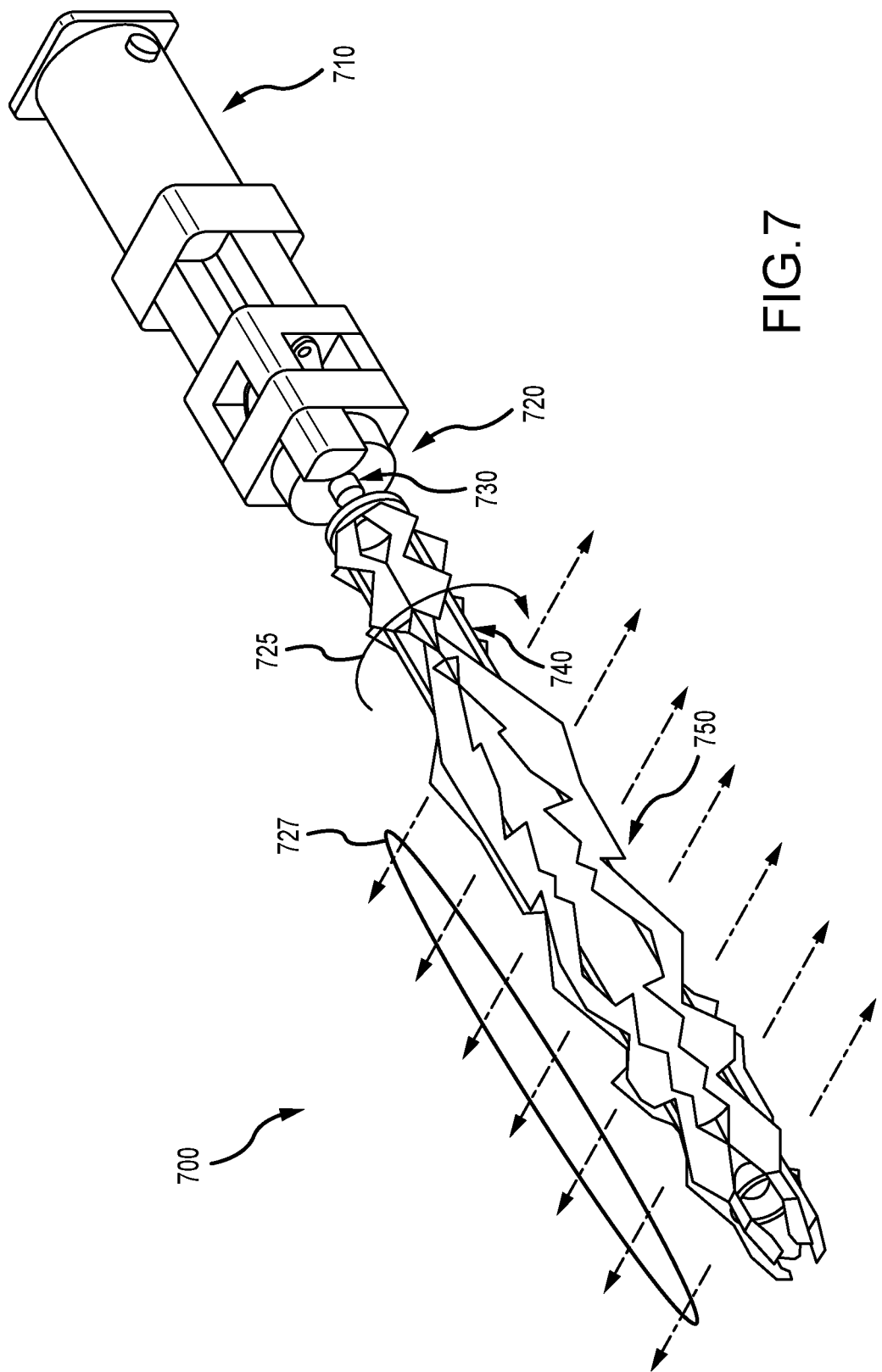
FIG. 7 is a perspective view of an exemplary prop, in the form of a rotating energy sword or light saber, for use in a moving prop assembly of the visual effects system of the present description.
Figure 8:
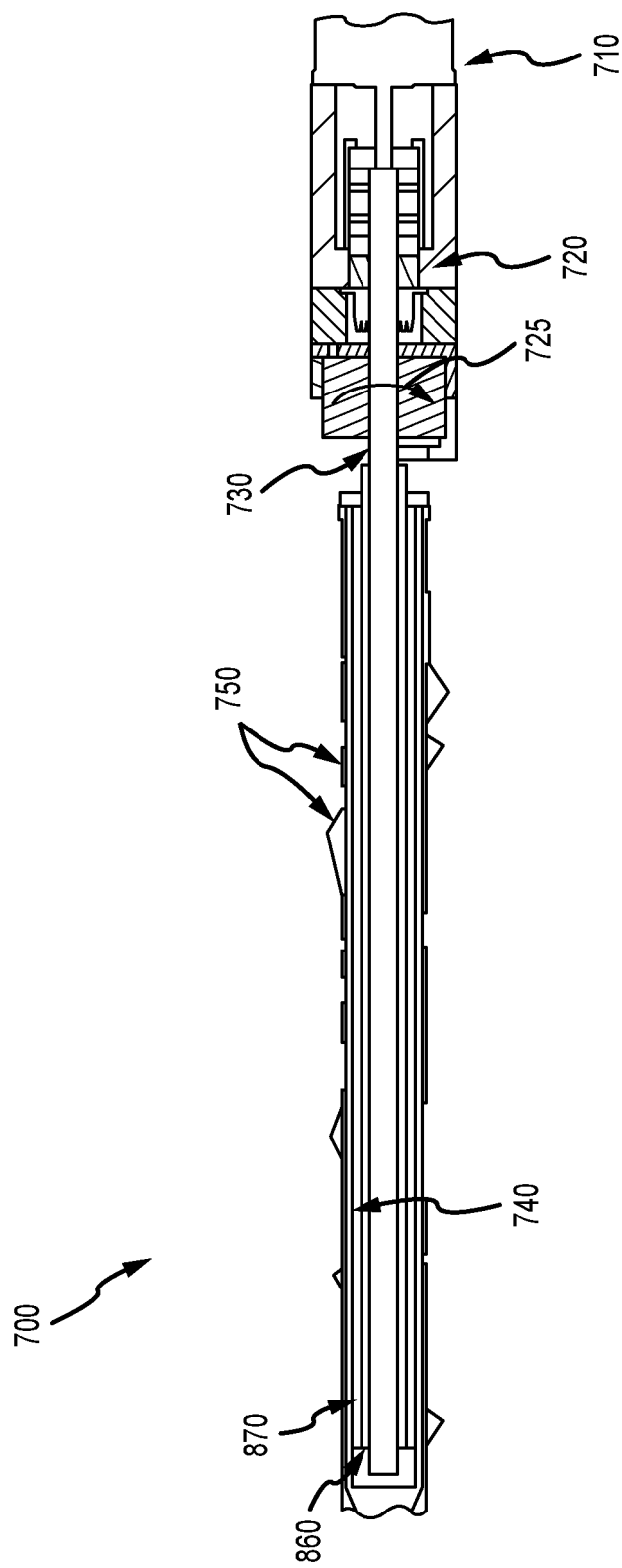
FIG. 8 is a side sectional view of the energy sword prop of FIG. 7.

These features may be added in a number of ways to practice the special effects system, but it may be useful to describe one useful embodiment of a prop that is configured to provide bright output lighting and to animate itself with onboard moving components. FIG. 7 illustrates a physical prop 700 in the form of a light saber or energy sword that can be supported in an effects system (as discussed above) on a screen element so it appears to be moved by the displayed character. This may be achieved by mounting the hilt or handle 710 to a mechanical arm and having the elongated body of the prop 700 extending outward from the projection surface toward the viewing space.

To provide onboard movement or animation, the prop 700 includes an electric motor 720 in the hilt/handle 710 that is coupled to an end of an inner tube or rod 730. The inner tube or rod 730 is caused to rotate about its longitudinal or central axis as shown with arrow 725 during operations of the motor 720 (and the special effects system in which the prop 700 is provided). The inner tube 730 acts as a support for the lighting assembly components used to achieve a lighting effect, and, as a result, the whole body of the prop 700 is animated with a spinning or rotating motion that can readily be observed by a viewer in the viewing space so as to reinforce the physicality of the prop 700. The inner tube or rod 730 has a length in the range of 12 to 36 inches (or more) as does the body (assembly of components extending outward from the hilt/handle 710) of the prop 700.

To provide a unique flame or glowing light effect, the prop includes one, two, or more strips of light sources (e.g., LEDs) 860, which may be white or colored, that are spaced apart about the circumference of the inner tube 730 and that extend along the length of inner tube. In one embodiment, a single row LED strip light was used that was 10 mm wide was used for four spaced-apart strips of light sources 860. When operated, the light source strips or arrays 860 output a bright light 727 in a direction away from the inner tube 730, and the spinning 725 causes the entire body of the prop to appear to be on fire or glowing (e.g., hides the presence of individual strip lights). To this end, the spinning rate is preferably above a predefined minimum, such as 100 to 150 RPM or higher, to disguise the presence of the light sources 860.

The onboard lighting assembly of the prop 700 further includes a diffusion layer 870 over the light source strips 860. In one case, the diffusion layer 870 was formed from a sheet of lenticular diffusion material. The diffusion layer 870 is provided to make each of the strips of light sources 860 appear optically to be an uninterrupted line of bright light. The light strips 860 may be powered while rotating from a slip ring in the handle 710 (e.g., a slip ring giving 24V during rotation 725).

To make a jagged random edge (which may be desirable in some cases but not required to implement the prop 700), cut up fins of a flexible material (such as China silk (that may be white)) that are aligned with the light source strips 860 may be used. In the embodiment shown, though, an outer tube 740 is provided over the diffuser layer 870 (and connected at its ends to the inner tube 730), and an outer coating 750 is provided (e.g., a cast silicone or the like) on the outer surfaces of the outer tube 740. The outer coating 750 and tube 740 are formed of material that is translucent-to-transparent to the light from the sources 860. The outer coating is randomly "sliced" to have an irregular and jagged (with peaks and valleys) texture to give it a randomized sharp-looking edge when spinning. During use of the prop 700, the motor 720 turns the inner tube or shaft 730 so as to cause the whole assembly described above to turn. Through persistence of vision, the prop 700 appears to have a tube extending out from the handle/hilt 710 that has a very hot center and flaming edges.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the term "walking" with regard to a character is used to mean any movement of a character, and it may include slow walking to faster walking and even running. The pace of the cart moving on the track may be adjusted to match the expected pace of movement of the moving character relative to the observer in light of the recorded/filmed movement of the actor. Also, the movement does not have to be forward but may, instead, be backward or away from the observer by using differing video files showing the character's back as they walk away or the character's front as they back up. The cart would in such situations be programmed to move the flat screen from a position proximate to the viewing space to second position further away (or nearer to the backwall).

The character may be human such as a human actor from a movie or may be a more fantastical character such as a character from an animated film (with the media including an animation clip of a walking animated character). Likewise, "walking" can be provided with one, two, or more legs, appendages, wheels, or even with nothing contacting the ground as may be the case for a hovering or flying character, with the typical human or human-like walking or movement discussed herein not intended to be limiting of the moving character illusion described herein.

We claim:

1. A system for providing a walking character special effect, comprising:
    a physical set with a platform with an upper surface adjacent a viewing space;
    a cart with a support platform and a drive mechanism operable, during an operating time period, to move the cart on a path on the upper surface between first and second positions relative to the viewing space;
    a screen element mounted on the support platform, wherein the screen element is substantially vertical and rigid and includes a projection surface facing the viewing space; and
    a video projector mounted on the support platform, wherein the video projector, during the operating time period, projects images of a character walking onto the projection surface.

2. The system of claim 1, further comprising a track on the upper surface of the physical set, wherein the first position is distal to the viewing space and the second position is proximate to the viewing space, and wherein the drive mechanism comprises an electric motor driving a set of wheels contacting the track.

3. The system of claim 2, wherein the video projector projects the image by playing a video file recording the character walking toward a camera at a predefined speed and wherein the electric motor is controlled during the operating time period to move the cart on the track at the predefined speed.

4. The system of claim 1, wherein the physical set further comprises a back wall positioned behind the upper surface with a surface of a first color facing the viewing space, wherein the screen element is oriented vertically, wherein the projection surface includes a central region colored a second color lighter than the first color, and wherein the projection surface includes a framing region extending about the periphery of the central region and to an outer edge of the screen element, wherein the framing region is colored to fade between the second color proximate to the central region and the first color proximate to the outer edge.

5. The system of claim 4, wherein the first color is absolute black.

6. The system of claim 1, further comprising a moving prop assembly including a prop movement mechanism attached to a back surface of the screen element and a physical prop linked to the prop movement mechanism, wherein a body of the physical prop extends outward from the screen element toward the viewing space and wherein the prop movement mechanism operates during the operating time period to move the body through a set of movements.

7. The system of claim 6, wherein the body of the physical prop houses a lighting assembly operating during the operating time period to illuminate the body, wherein the physical prop includes a light shield blocking light from the illuminated body from striking the projection surface, and wherein the physical prop further includes a drive element operating during the operating time period to rotate the body about a longitudinal axis.

8. The system of claim 7, wherein the drive element comprises an electric motor, wherein the body comprises: (a) a central tube coupled to the electric motor for rotation about the longitudinal axis; (b) at least one strip of light emitting diodes (LEDs) extending along an outer surface of the central tube; and (c) a layer of diffusing material over the at least one strip of LEDs.

9. The system of claim 1, wherein the physical set comprises sidewalls defining a tunnel, wherein the first and second positions are within the tunnel, wherein an interior surface of the sidewalls includes a series of spaced apart surfaces adapted for illumination upon receiving black light, and wherein the system further includes a black light source directing, during the operating time period, black light across the tunnel toward the series of spaced apart surface.

10. The system of claim 1, wherein the video projector projects the image by playing a video file recording the character walking through lights provided by two or more light sources, wherein the physical set includes two or more faux light sources with positions based on positions of the two or more light sources during the recording, and wherein each of the faux light sources includes a container with a surface facing the viewing space and a light source directing light, during the operating time period, onto the surface facing the viewing space and not toward the projection surface.

11. A system for providing a walking character special effect, comprising:
    a track defining a travel path from a first position distal to a viewing space to second position proximate to the viewing space;
    a cart comprising a drive mechanism driving the cart between the first and second positions during an operating time period;
    a screen element supported on the cart with a vertical orientation, wherein the screen element includes a projection surface facing the viewing space;
    a backdrop with a black surface positioned behind the cart and the screen element; and
    a video projector supported on the cart and oriented to project onto the projection surface, wherein the video projector, during the operating time period, plays a video file comprising footage of a character walking.

12. The system of claim 11, wherein the footage shows a front side of the character walking forward at a predefined speed and wherein the drive mechanism operates to drive the cart on the track at a speed based on the predefined speed.

13. The system of claim 11, wherein the projection surface includes a central region with a color lighter than the black surface of the backdrop, wherein the projection surface includes a framing region extending about the periphery of the central region and including an outer edge of the screen element, and wherein the framing region is colored to fade over its width from the color of the central region to a black matching the black surface of the backdrop.

14. The system of claim 11, further comprising a moving prop assembly including a prop movement mechanism attached to a back surface of the screen element and a physical prop linked to the prop movement mechanism, wherein physical prop includes an elongated body that extends outward from the screen element toward the viewing space, and wherein the prop movement mechanism operates during the operating time period to move the body through a set of movements that are time synchronized with movements in the video file.

15. The system of claim 14, wherein the elongated body of the physical prop houses a lighting assembly operating during the operating time period to illuminate the body, wherein the physical prop includes a light shield blocking light from the illuminated body from striking the projection surface, and wherein the physical prop further includes a drive element operating during the operating time period to rotate the elongated body about a longitudinal axis.

16. The system of claim 15, wherein the drive element comprises an electric motor, wherein the elongated body comprises: (a) a central tube coupled to the electric motor for rotation about the longitudinal axis; (b) at least one strip of light emitting diodes (LEDs) extending along an outer surface of the central tube; and (c) a layer of diffusing material over the at least one strip of LEDs.

17. The system of claim 11, wherein the physical set comprises sidewalls defining a tunnel, wherein the first and second positions are within the tunnel, wherein an interior surface of the sidewalls includes a series of spaced apart surfaces adapted for illumination upon receiving black light, and wherein the system further includes a black light source directing, during the operating period, black light across the tunnel toward the series of spaced apart surface.

18. The system of claim 11, wherein the video file includes images of the character walking through lights provided by two or more light sources, wherein system further comprises two or more faux light sources with positions based on positions of the two or more light sources in the video file, and wherein each of the faux light sources includes a container with a surface facing the viewing space and a light source directing light, during the operating period, onto the surface facing the viewing space and not toward the projection surface.

19. A method of presenting a walking character special effect, comprising:
projecting video imagery of a character onto a projection screen, wherein the character in the video imagery is walking and facing forward;
concurrently with the projecting, moving the projection screen from a first position distal to a viewing space to a second position proximate to the viewing space; and
prior to the projecting, positioning a black backdrop behind the projection screen,
wherein the moving of the projection screen is at a speed matching the walking of the character in the video imagery, and
wherein the projection screen includes a central region that is lighter in color than the black backdrop and a framing region extending about the periphery of the central region that fades in color to black at an outer edge of the projection screen.

20. The method of claim 19, further including, concurrently with the projecting, directing a stream of UV light across a space between the first and second positions onto a series of spaced-apart surfaces that are illuminated by UV light.

21. The method of claim 19, further including, concurrently with the projecting, positioning a physical prop proximate to the projection screen and between the projection screen and the viewing space and moving the physical prop relative to the projection screen.

22. The method of claim 21, further including illuminating the physical prop and shielding the projection screen from light output by the physical prop during the illuminating.

\* \* \* \* \*